Luc Secretan
INVENTOR

Luc Secretan
INVENTOR

By
Attys.

3,381,517
United States Patent Office
                                                                   Patented May 7, 1968

3,381,517
ROTARY BEAD DROPPER AND SELECTOR FOR TESTING MICROMETEORITE DETECTORS
Luc Secretan, Riverdale, Md., assignor to the United States of America as represented by the Administrator of the National Aeronautics and Space Administration
Filed Aug. 30, 1965, Ser. No. 483,886
31 Claims. (Cl. 73—1)

ABSTRACT OF THE DISCLOSURE

Apparatus and method for calibrating a micrometeorite transducer detector by accurately dispensing a plurality of small, spherical beads, at a predetermined rate, upon the transducer detector. A bead dropper is moveably attached to a stationary support member such that it is positioned above the transducer detector. Drive means are provided to both move the bead dropper in a spiral path with respect to the transducer detector and drive a helical screw (within the bead dropper) such that the beads are fed thereby to a gate in the bead dropper and serially dispensed therefrom to fall on a transducer plate which is affixed to the transducer detector. An electrical output from the transducer detector is applied to a display means which records the impact of the individual beads and thereby provides a calibration of the transducer detector.

---

The invention described herein may be manufactured and used by or for the Government of the United States of America for governmental purposes without the payment of any royalties thereon or therefor.

This invention relates to a method and means for calibrating a micrometeorite detector and more specifically to an object dispenser for releasing objects at predetermined rates for impact upon a transducer detector.

The knowledge of the flux of micrometeorites around the earth and in the solar system is of greatest value to space research. As with practically all measuring instruments, the instruments must be calibrated so as to yield a quantative indication having intelligible meaning. The present invention provides a method and means for calibrating a momentum sensitive transducer which is intended for subsequent detection of micrometeorite impacts on a space vehicle to gain knowledge regarding the flux of micrometeorites near the earth and in the solar system.

The micrometeorites encountered about the earth and in the solar systems travel at velocities ranging up to 70 kilometers per second relative to an orbiting satellite. This tremendously high velocity imparts to the small particles, weighing one hundred millionth of a gram or less, a very high penetration and erosion power. Injury to astronauts and damage to sensitive equipment can result from the erosion due to the bombardment by these tiny, high velocity particles.

By means of instrument calibration it is desired that micrometeorite flux as well as the momentum of the micrometeorites be determined. In previous calibration methods, a platform was suspended above a momentum sensitive transducer. A small instrument, such as a toothpick, was employed to push one grain of sand or a glass bead from the platform for impact upon the momentum sensitive transducer. It is quite obvious from this manner of operation, that little control of particle size was obtainable as well as little control over the point of impact of the particle. In other words, the manner of calibration as practiced by this method, was a hit-or-miss operation. Results varied widely and large quantities of "drops" were needed to obtain any type of statistical average.

Next, an improvement was devised wherein a number of selected glass beads were loaded by hand in a perforated rotary disk so that only one bead at a time would fall through an aperture provided beneath the rotary disk. This method provided some control over particle size and particle drop area although a primary disadvantage was in the time required for loading the disk. Other factors necessitated the desire for an improved means which is simple and economical in operation for dispensing objects for impact upon a momentum sensitive transducer at a prescribed and pre-selected rate.

The present invention provides a means for dispensing objects having a known mass for impact upon a momentum sensitive transducer and wherein the pattern made by the falling objects may be closely controlled to describe, for example a spiral or serpentine. The number of "drops" per square inch may be varied as well as the rate at which the objects are dropped. The device comprises four main sections: a support stand which supports the object dispenser or dropper and the momentum sensitive transducer or detector, the detector being positioned below the object dispenser; a driving means comprising a motor and its associated gear trains; a large circular alignment and friction plate, ribbed on its top side for rigidity, smooth and flat on its underside, and which supports the object dispenser; and the object dispenser or bead dropper carried by the supporting plate and permitted to be driven therearound by the associated gear train. The bead dropper is suspended by a carriage supported by a central hub under the plate and by a peripheral ridge or rim of the plate. A lead screw is rotated and engages the bead dropper so as to uniformly vary the distance of the bead dropper from the central hub of the supporting plate. The beads are simply loaded by dropping them from a container in a bead receiving trough.

Accordingly, it is the principal object of the present invention to improve methods and apparatus for calibrating momentum sensitive transducers.

It is a further object of the present invention to provide a method and means for calibrating a momentum sensitive transducer which is subsequently subjected to micrometeorites encountered in space research.

It is a further object of the present invention to provide a means for calibrating a momentum sensitive transducer whereby the erosion of an orbiting satellite and its measuring instruments due to meteorite collisions can be determined.

It is a further object of the present invention to provide an apparatus for calibrating, under closely controlled simulated space conditions, a detector for measuring particle flux and momentum of micrometeorites near the earth and in the solar system.

It is a further object of the present invention to provide an apparatus for selectively causing specimens to be dispensed to strike a transducer plate whose electrical output can be interpreted to yield the momentum of the specimen.

It is still a further object of the present invention to provide an apparatus for selectively and serially dropping small spheres, of known mass, upon a momentum sensitive transducer plate to yield an electrical output therefrom indicative of the sensitivity and accuracy of the transducer.

These and other objects of the present invention are accomplished by supporting an object dispenser above a metal, ceramic or glass plate. A piezoelectric crystal, usually of cylindrical shape and serving as the transducer or detector is mounted normally at the center of the plate. The plate can be from one to eight inches across and may be round or polygonal. It is supported horizontally or at a slight tilt by appropriate means. A circular supporting plate having a centrally driven hub and a peripheral rim supports, upon a movable carriage, a sphere dispensing apparatus. As the central hub rotates, a lead screw decreases or increases the distance of the sphere dispenser from the central hub so that the pattern of dispensed spheres or beads upon the transducer plate is that of a spiral or may be that of a serpentine. The spheres are dispensed through the cooperation of a helical screw and a gate, the helical screw being driven through the frictional engagement of a wheel with the underside of the supporting plate. The spheres engage the "threads" of the screw, pass under the gate, and are serially dispensed in the prescribed pattern and at preselected intervals upon the transducer plate or detector. A counter is provided as well as a degree indication upon the peripheral rim of the supporting plate.

The invention both as to its organization and method of operation together with further objects nad advantages thereof will best be understood by reference to the following specification taken in conjunction with the accompanying drawings in which.

Figure 1:
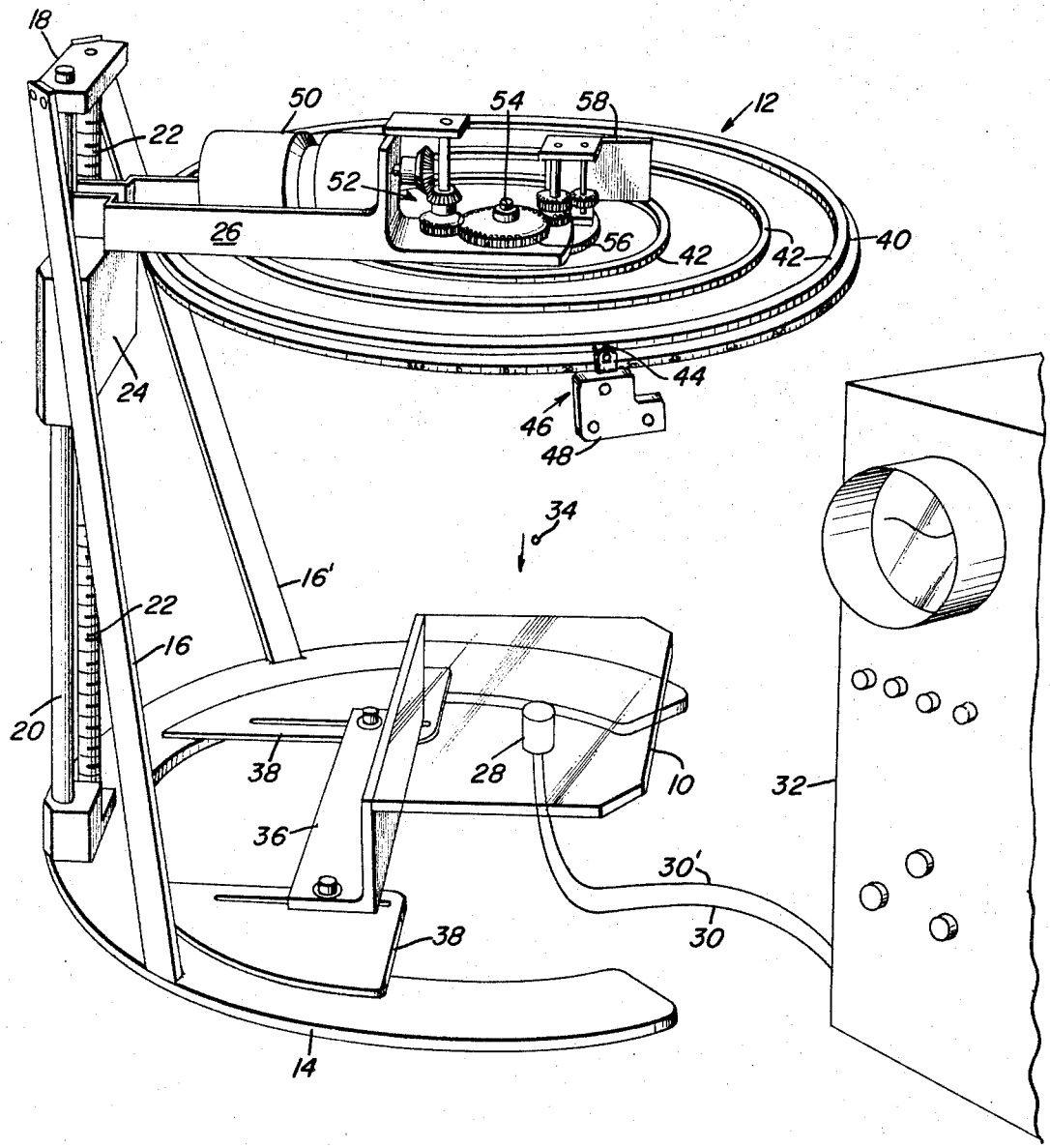
FIGURE 1 is a perspective view of the invention and illustrating the object dispensing apparatus, the transducer plate for intercepting the objects, and an electrical recording means.

As shown in the FIGURE 1, a transducer plate 10 is positioned below an object dispenser 12, the spatial relationship of the transducer plate 10 and the object dispenser 12 being maintained by a stand having a generally circular base section 14, a pair of angular supports 16 and 16' which converges to a small plate 18. A smooth shaft 20 and a threaded shaft 22 extend vertically from the base section 14 and are secured, along with the supports 16 and 16', to the small plate 18. A guide block 24 surrounds the smooth shaft 20 and the threaded shaft 22 and supports a horizontally extending bracket 26 which supports and retains the object dispenser 12 in the desired position. Rotation of the threaded shaft 22, which is threaded through the guide block 24, will raise or lower the object dispenser 12.

The transducer plate 10 has a transducer or detector 28 positioned thereunder and centrally located on the underside of the transducer plate 10. In the FIGURE 1, the transducer plate 10 is of transparent material so that the detector 28 is readily visible. The detector 28 may be a piezoelectric crystal whose output is connected by a pair of leads 30 and 30' to an oscilloscope 32. The cathode ray tube of the oscilloscope 32 produces a trace of the electrical output signal of the detector 28 each time a bead 34 strikes the transducer plate 10. One such bead 34 is shown in its passage from the object dispenser 12 to the transducer plate 10. A camera or other recording means may be coupled to the oscilliscope 32 for permanently recording the signal produced on the CRT as the beads 34 impact the transducer plate 10. The transducer plate 10 is supported upon the base section 14 in any suitable manner such as the angle bracket 36 engaging, at each of its ends, flat sections 38 and 38' which are secured to the base section 14 in any suitable manner. It will be observed that through the cooperation of the bolts on the angle bracket 36 and the elongated slots and the flat sections 38 and 38', the transducer plate 10 may be moved and secured in the desired position.

The object dispenser 12 includes a circular supporting plate 40 which will be seen in later figures to be flat on its under surface but is ribbed at 42 on its upper surface so as to provide rigidity to the plate 40. The outermost rib 42 is removed a slight distance inwardly from the peripheral rim of the plate 40 so as to permit a roller 44 to ride therealong and support one end of a carriage 46, only an end plate 48 being visible along with the roller 44 in the FIGURE 1. The carriage 46 rotates about the underside of the plate 40 in either direction, the direction being dependent upon the direction of rotation of a motor 50 which is supported between the projecting arms of the horizntal bracket 26 and immediately above a portion of the plate 40. The output of the motor 50 is suitably connected through supports and a gear train 52 to rotate a shaft 54 through the gear 56. Counter means, not shown, may be attached to the apparatus indicated at 58, the apparatus 58 having shafts and gears which are rotated from the centrally driven gear 56. The counter that would be connected to the apparatus 58 would be adapted to count the revolutions of the carriage 46 about its central pivot (to be hereinafter described); and by viewing the marks along the peripheral rim of the plate 40, which indicate the degrees of rotation of the carriage 46 about the fixed supporting plate 40, an operator can readily identify each record (photograph, ink trace, etc.) of the output of the oscilliscope 32 and locate the point of impact on the transducer plate 10, by the apparatus to be hereinafter described.

Figure 2:
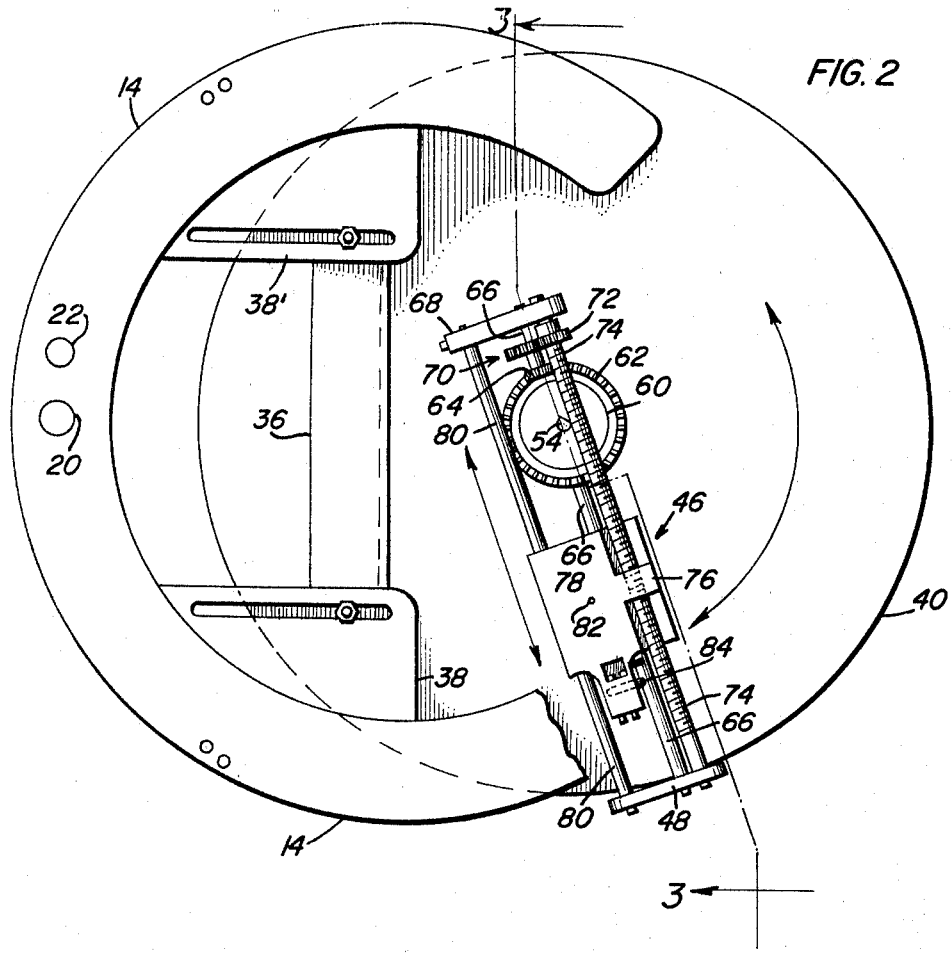
FIGURE 2 is a bottom view of the invention and clearly illustrating the carriage mechanism and the bead dispenser.

The FIGURE 2 is a bottom view of the apparatus which affords a view of the carriage 46 and its manner of attachment to and travel about the supporting plate 40. More specifically, a hub 60 is rotated by the shaft 54, the shaft 54 having rotary motion applied thereto by the motor 50 of the FIGURE 1. A stationary bevel gear 62 is affixed to the underside of the stationary supporting plate 40 in any suitable manner and is engaged by and meshes with an idler bevel gear 64 which is freely rotatable upon a smooth shaft 66. The shaft 66 extends from the end plate 48, through the hub 60, and supported by a second end plate 68. Thus, as the hub 60 rotates, the shaft 66, passing therethrough, will be driven so that the carriage 46 moves about the underside of the stationary supporting plate 40.

With continued reference to the FIGURE 2, as the shaft 66 drives the carriage 46 about the stationary supporting plate 40, the idler bevel gear 64 is caused to rotate due to its engagement with the stationary bevel gear 62 and a gear train 70 is employed to transmit this motion to a gear 72 which is rigidly connected to a threaded shaft 74. The threaded shaft 74 is substantially parallel to the smooth shaft 66 and is also supported by the end plates 48 and 68. The threaded shaft passes through a portion 76 of a bead dispenser 78 (dropper), the portion 76 being internally threaded so as to mate with the threads of the threaded shaft 74. As the threaded shaft 74 rotates through the cooperation of the gear train 70 and the meshing of the idler bevel gear 64 with the stationary bevel gear 62, the bead dispenser 78 will be caused to move toward or away from the centrally positioned hub 60, the direction being dependent upon the direction of rotation of the threaded shaft 74.

A shaft 80, which is a smooth shaft and substantially identical to the shaft 66, is supported between the end plates 48 and 68 and passes through a smooth portion of the bead dispenser 78 so that through the cooperation of the threaded shaft 74 and the smooth shaft 80, the bead dispenser 78 is supported and positioned.

Thus far, two separate modes of operation have been described. The first mode is the driving of the carriage 46 about the under surface of the stationary supporting plate 40 through the cooperation of the shaft 66 with the rotatable and centrally positioned hub 60. The second mode of motion is the movement of the bead dispenser 78 toward and away from the end plate 48 through the rotation of the threaded shaft 74 which is driven through a series of gears by the mating beveled gears 62 and 64. The third mode of motion, to be briefly described and to be described in detail subsequently, is the rotation of a threaded shaft within the bead dispenser 78 so as to drop the beads 34 through an aperture 82 in the lower surface of the bead dispenser 78. The rotation of the shaft, to be hereinafter described, is accomplished through a resilient, rotatable wheel 84 which is secured to the shaft to be rotated and in peripheral engagement with the under surface of the stationary supporting plate 40. As the hub 60 drives the carriage 46 about the under surface of the plate 40, the wheel 84 will be caused to rotate due to its engagement with the plate 40.

Figure 3:
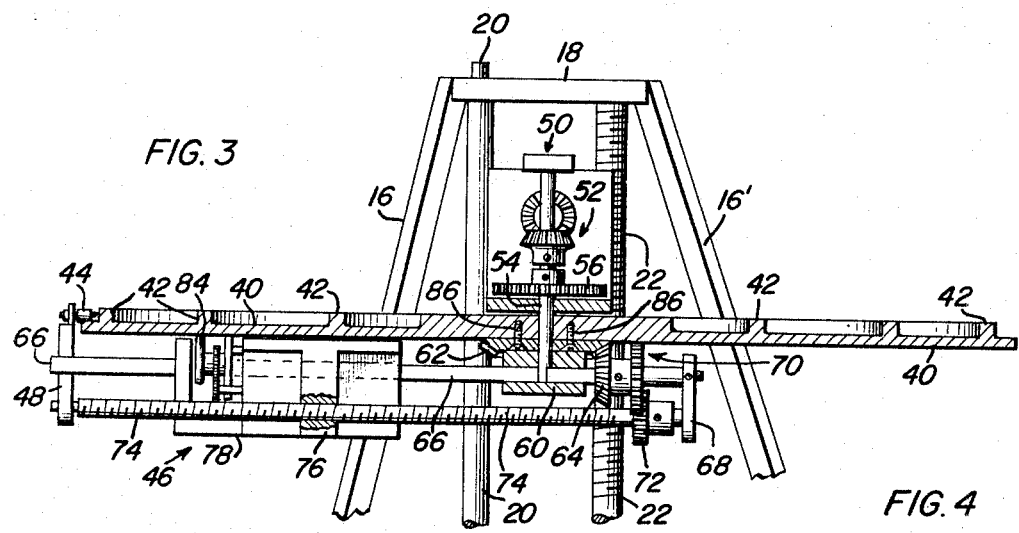
FIGURE 3 is a sectional view taken along the line 3—3 of the FIGURE 2 and illustrating the carriage mechanism supported under the top circular plate.

The FIGURE 3 is a sectional view taken along the line 3—3 of the FIGURE 2 and shows a side elevational view of the apparatus and is particularly illustrative of the details of the carriage 46. The carriage 46 is formed by the smooth shaft 66, the threaded shaft 74, and the smooth shaft 80 (not shown in the FIGURE 3) being supported between the end plates 48 and 68. One end of the carriage 46 is supported through the passage of the shaft 66 through the rotating hub 60 while the opposite end of the carriage 46 is supported by a roller 44 which is affixed to the end plate 48 and rides about the peripherial rim of the stationary supporting plate 40. The stationary supporting plate 40 is substantially flat, as shown, on its under surface and is ribbed at 42 on its upper surface so as to provide strength and rigidity to the plate 40. The stationary bevel gear 62 is secured to the under surface of the stationary supporting plate 40 by any suitable means such as the bolts 86 and the under surface of the stationary bevel gear 62 is in sliding engagement with the top surface of the hub 60 since the hub 60 is rotated by the shaft 54 so as to drive the carriage 46 in a circular sweep about the under surface of the plate 40.

From the FIGURE 3, it will be intuitively clear that as the hub 60 rotates, the bevel gear 64 walks about the stationary bevel gear 62 so that the gear 72 is rotated through the cooperation of the gear train 70. As previously set forth, rotation of a bead dispensing shaft is produced by the engagement of the resilient wheel 84 with the under surface of the stationary supporting plate 40 as best illustrated in the FIGURE 3.

Figure 4:
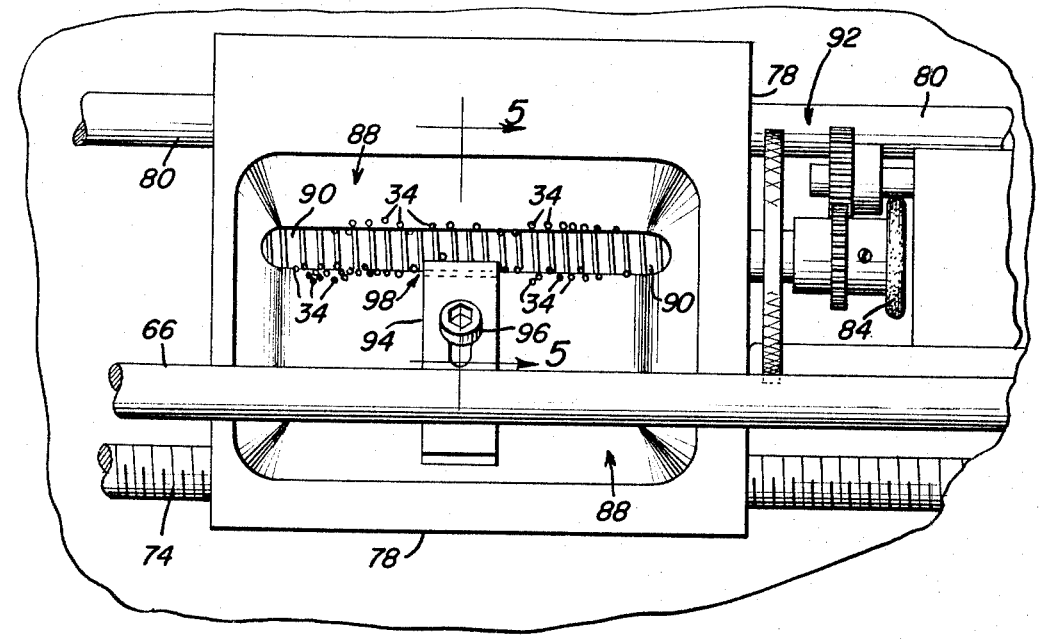
FIGURE 4 is a plan view of the bead dispenser and showing a plurality of beads in the trough awaiting entry into the gate means.

With reference to the FIGURE 4, the bead dispenser 78 is shown supported by the threaded shaft 74, which shaft 74 acts as a lead screw for advancing the bead dispenser 78, and the smooth shaft 80. The shaft 66 is shown in its position passing over the bead dispenser 78. The bead dispenser 78 includes a hollowed out trough portion 88 which is employed to support a quantity of beads 34. The trough 88 slopes downwardly to an open section through which a threaded dispensing shaft 90 is disposed. The dispensing shaft 90 is rotated through the cooperation of a gear train 92 with the small resiliently covered wheel 84. As the wheel 84 rotates in engagement with the under surface of the stationary supporting plate 40, the gear train 92 will transmit this rotation to the dispensing shaft 90.

Figure 5:
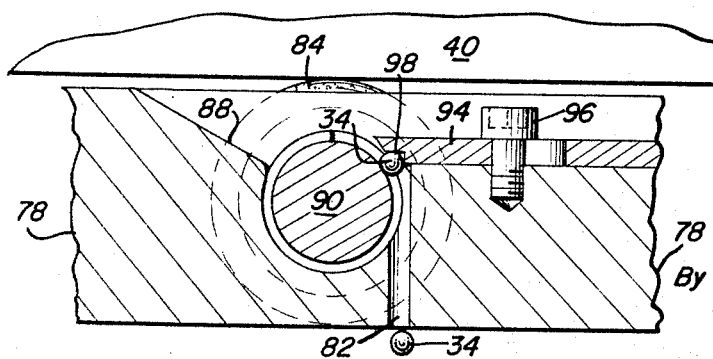
FIGURE 5 is a sectional view taken along the line 5—5 of the FIGURE 4 and showing the manner in which the beads pass under the gate, along the threads of the dispensing shaft and are dropped for impact upon the detector plate.

With reference to the FIGURES 4 and 5, the manner in which the beads or objects 34 are dispensed and dropped so as to impact the transducer plate 10 of the FIGURE 1, will be set forth. A supply of beads 34 in the trough 88 will roll downwardly toward the dispensing shaft 90. A gate 94 is centrally disposed in the trough 88 and very close to the dispensing shaft 90. The gate 94 is maintained in position by a bolt 96. The under surface 98 of the gate 94 along the dispensing shaft 90 is notched so that the gate 94, through the cooperation of the threads of the dispensing shaft 90 admits a single bead each time the rotating thread of the shaft 90 approaches the side of the gate 94. That is to say, that the summation of the depth of the thread of the dispensing shaft 90 and the depth of the notch 98 of the gate 94, is equal to or just slightly more than the diameter of the beads 34. In this manner, any beads larger than the preselected diameter would be rejected while any beads having lesser diameter would not be initially loaded into the trough 88. As best shown in the FIGURE 5, a bead 34 is shown under the gate 94 and as the bead 34 approaches the aperture 82, the bead 34 will follow the path of the arrow and be dispensed so as to impact the transducer plate 10 of the FIGURE 1. The shaft 90 can be rotated in either direction and is usually rotated very slowly so that the beads 34 may enter either on the left side or the right side of the gate 94 as viewed in the FIGURE 4. Of course, the gate 94 can be moved to the opposite side of the dispensing shaft 90, as found convenient.

Figure 6:
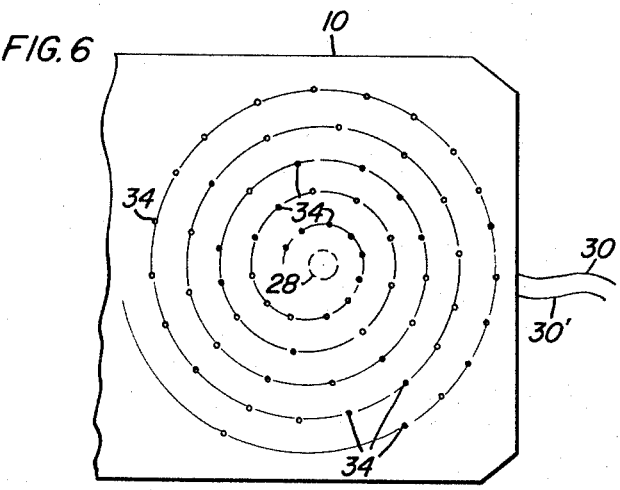
FIGURE 6 is a view illustrating the bead pattern upon the detector plate of the FIGURE 1.

The beads 34 may be dispensed in any desired pattern, the pattern being dependent upon the speeds of rotation of the various hubs, shafts, wheels, etc. and the pitch of the gears and threaded shafts for driving the apparatus. One such pattern, disclosed in the FIGURE 6, is generally spiral in plan view and illustrates the pattern as the beads 34 are dispensed from the aperture 82 of the bead dispenser 78 as the bead dispenser 78 travels either toward or away from the hub 60—an enlarging spiral path being described as the bead dispenser 78 moves away from the hub 60 and a decreasing or narrowing spiral being described as the bead dispenser 78 moves toward the hub 60. It will be readily apparent to those skilled in the art that the ability of the apparatus to dispense a sufficient quantity of beads about the transducer plate 10 in any pattern so as to obtain a statistical sampling of the electrical output caused by the impact, is a salient feature of the invention.

Thus, there has been illustrated and described a detector which can be calibrated to measure the flux and momentum of micrometeorites encountered in space research. The knowledge of the flux of the micrometeorites around the earth and in the solar system is of greatest value. The micrometeorites travel at velocities ranging upward to 70 kilometers per second relative to an orbiting satellite. This very high velocity imparts to the very small particles an extremely high penetration and erosion power. Injury to astronauts and damage to sensitive optical equipment may result from the erosion due to the bombardment by these particles.

In the present invention, a plurality of spheres of known mass are dispensed for impact, one at a time, on a specified area, from a specified height and at approximately a specified time. The spheres are caused to impact a momentum sensitive transducer which is intended to detect micrometeorite impacts on space vehicles. The momentum sensitive transducer or detector may be a piezoelectric crystal, usually of cylindrical shape, mounted normally at the center of a metal, ceramic or glass plate. This plate is of sufficient size so as to receive the spheres and is supported horizontally or at a slight tilt by appropriate means. The impact caused by the dropping beads or spheres will strike the plate and at any point will generate an electric pulse that may be recorded photographically by high speed film from an oscilloscope trace. Other means of recording, such as by a computer analyzer, are well within the teaching of the invention.

The calibration method includes the dropping of spheres of known mass from a known height upon the momentum sensitive transducer and simulates to a degree the effect of micrometeorite impacts. The product $(1+e)$ mv. determines the momentum of the spheres at the moment of impact, where $e$ equals the coefficient of restitution for the materials of the spheres and of the momentum transducer plate. The amplitude of the signal, in volts, serves as a measure of the sensitivity of the transducer. It is required that the uniformity of the response of any point over the entire plate be determined since stresses, echoes and resonance can create insensitive or hypersensitive areas that must be mapped out. Because of variables, over which there is little or no control, several hundred spheres must be dropped over the whole area to obtain a statistical sensitivity profile. Finally, since many of the variables are due to atmospheric conditions, the test is best carried out in a vacuum.

In the preferred embodiment, the beads or spheres are dispensed from the bead dropper in a spiral pattern. The whole area of the instrument to be calibrated and centered under the plate, can thus be explored. The spiral movement of the bead dropper is preferred in the practice of the invention. Other types of motion may be employed but the spiral motion offers the advantages of greater simplicity in construction, fewer parts and greater ease in recording the data. The center of rotation of the device and the centrally located crystal of the detector plate under test are brought into coincidence to form a coherent polar coordinate system. The position of the bead dropper is easily read at any moment from the number of turns recorded on the counter and from the angular position of the carriage as determined by the indications on the periphery of the supporting plate.

It will readily appear that, due to its automatic or semi-automatic operation, the invention represents a great labor saving device when compared to the prior art methods of dropping individual beads, one-by-one, by hand.

In addition, it might be well to point out that the bead dropper per se, without the automatic drive mechanism described above, can be used for casual calibration tests as a portable unit, either motor driven or hand operated.

Thus, the present invention may be embodied in other specific forms without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. Apparatus for dispensing objects at a selected rate comprising circular support means having a central hub and a peripheral rim, means for driving said hub, and an object dispensing means supported between said hub and said rim and driven by said hub.

2. Apparatus for dispensing objects in a prescribed pattern comprising support means having a central hub and a peripheral rim, means for driving said hub, and means controlled by said hub and partially supported by said rim for dispensing objects in a spiral pattern.

3. Apparatus for dispensing objects comprising circular support means having a peripheral rim, a rotatable hub centrally positioned upon said support means, means for driving said hub, and means driven by and supported by said hub and said rim for dispensing objects.

4. Apparatus for dispensing objects comprising circular support means having a peripheral rim, a rotatable hub centrally positioned upon said support means, means for driving said hub, means for dispensing objects, and means driven by and supported by said hub and said rim for supporting said means for dispensing objects.

5. Apparatus for dispensing objects comprising circular support means having a peripheral rim, a rotatable hub centrally positioned upon said support means, means for driving said hub, means for dispensing objects, means driven by and supported by said hub and said rim for supporting said means for dispensing objects, and means for positioning said means for dispensing objects with respect to said hub.

6. Apparatus for dispensing objects comprising circular support means having a peripheral rim, a rotatable hub centrally positioned upon said support means, means for driving said hub, means for dispensing objects, means driven by and supported by said hub and said rim for supporting said means for dispensing objects, and means engageable with said support means for actuating said means for dispensing objects.

7. Apparatus for dispensing objects comprising circular support means having a peripheral rim, a rotatable hub centrally positioned upon said support means, means for driving said hub, a helical screw cooperating with gate means for dispensing objects, and means driven by and supported by said hub and said rim for supporting said helical screw and gate means.

8. Apparatus for dispensing objects comprising circular support means having a peripheral rim, a rotatable hub centrally positioned upon said support means, means for driving said hub, a helical screw cooperating with gate means for dispensing objects, means driven by and supported by said hub and said rim for supporting said helical screw and gate means, and means for positioning said helical screw and gate means with respect to said hub.

9. Apparatus for dispensing objects comprising circular support means having a peripheral rim, a rotatable hub centrally positioned upon said support means, means for driving said hub, a helical screw cooperating with gate means for dispensing objects, means driven by and supported by said hub and said rim for supporting said helical screw and gate means, and means in frictional engagement with said support means for rotating said screw and thereby permit said gate means to dispense objects.

10. Apparatus for dispensing objects comprising circular support means having a peripheral rim, a rotatable hub centrally positioned upon said support means, means for driving said hub, means for dispensing objects, means driven by and supported by said hub and said rim for supporting said means for dispensing objects, and a lead screw driven through said hub and in engagement with said means for dispensing for positioning said means for dispensing with respect to said hub.

11. Apparatus for dispensing objects comprising circular support means having a peripheral rim, a rotatable hub centrally positioned upon said support means, means for driving said hub, a helical screw cooperating with gate means for dispensing objects, means driven by and supported by said hub and said rim for supporting said helical screw and gate means, and a lead screw means driven through said hub for positioning said helical screw and gate means with respect to said hub.

12. Apparatus for dispensing objects comprising circular support means having a peripheral rim, a rotatable hub centrally positioned upon said support means, means for driving said hub, means for dispensing objects, means driven by and supported by said hub and said rim for supporting said means for dispensing objects, and a wheel in frictional engagement with said support means for actuating said means for dispensing objects.

13. Apparatus for dispensing objects comprising circular support means having a peripheral rim, a rotatable hub centrally positioned upon said support means, means for driving said hub, a helical screw cooperating with gate means for dispensing objects, means driven by and supported by said hub and said rim for supporting said helical screw and gate means, and a wheel in frictional engagement with said support means for rotating said helical screw cooperating with said gate means for dispensing objects.

14. Apparatus for dispensing objects comprising circular support means having a peripheral rim, a rotatable hub centrally positioned upon said support means, means for driving said hub, a ring gear concentric with said hub and secured to said support means, a carriage means supported between said hub and said rim, said carriage means including a rod in driving engagement with said hub, object dispensing means supported upon said carriage means, and means cooperating with said ring gear and said dispensing means for positioning said dispensing means with respect to said hub.

15. Apparatus for dispensing objects comprising circular support means having a peripheral rim, a rotatable hub centrally positioned upon said support means, means for driving said hub, a ring gear concentric with said hub and secured to said support means, a carriage means supported between said hub and said rim, said carriage means including a rod in driving engagement with said hub, object dispensing means supported upon said carriage means, a lead screw positioned within said carriage means and engaging said object dispensing means, and means cooperating with said lead screw and said ring gear for positioning said dispensing means with respect to said hub.

16. The combination as defined in claim 15 wherein said means cooperating with said lead screw and said ring gear for positioning said dispensing means with respect to said hub is a gear train.

17. Apparatus for dispensing objects comprising circular support means having a peripheral rim, a rotatable hub centrally positioned upon said support means for driving said hub, a ring gear concentric with said hub and secured to said support means, a carriage means supported between said hub and said rim, said carriage means including a rod in driving engagement with said hub, object dispensing means supported upon said carriage means, said object dispensing means including a trough, a helical screw passing therethrough and a gate positioned upon said trough and cooperating with said helical screw for dispensing objects, and means cooperating with said ring gear and said dispensing means for positioning said dispensing means with respect to said hub.

18. The combination as defined in claim 17 including means in engagement with said support means for rotating said helical screw.

19. The combination as defined in claim 18 wherein said means in engagement is a resilient wheel.

20. The combination as defined in claim 18 wherein said means cooperating with said ring gear and said dispensing means for positioning said dispensing means with respect to said hub is a lead screw supported by said carriage means and engaging said object dispensing means, and a gear train coupling said lead screw to said ring gear.

21. Apparatus for calibrating a micrometeorite detector comprising a momentum sensitive transducer and means in spatial relationship to said transducer for releasing spheres for impact upon said transducer, said means in spatial relationship including support means, a sphere dispensing means supported by said support means, and driving means positioned upon said support means for both moving said dispensing means about said transducer and controlling the dispensing of said spheres from said dispensing means to said transducer.

22. Apparatus for calibrating a micrometeorite detector comprising a momentum sensitive transducer and means in spatial relationship to said transducer for releasing spheres for impact upon said transducer, said means in spatial relationship including support means having a central hub and a peripheral rim, means for driving said hub, and means controlled by said hub and partially supported by said rim for dispensing spheres in a spiral pattern upon said transducer.

23. Apparatus for calibrating a micrometeorite detector comprising a momentum sensitive transducer and means in spatial relationship to said transducer for releasing spheres for impact upon said transducer, said means in spatial relationship including circular support means having a peripheral rim, a rotatable hub centrally positioned upon said support means, means for driving said hub, a helical screw cooperating with gate means for dispensing spheres, means driven by and supported by said hub and said rim for supporting said helical screw and gate means, and means in frictional engagement with said support means for rotating said screw to thereby permit said gate means to dispense spheres toward said transducer.

24. Apparatus for calibrating a micrometeorite detector comprising a momentum sensitive transducer and means in spatial relationship to said transducer for releasing spheres for impact upon said transducer, said means in spatial relationship including circular support means having a peripheral rim, a rotatable hub centrally positioned upon said support means, means for driving said hub, a ring gear concentric with said hub and secured to said support means, a carriage means supported between said hub and said rim, said carriage means including a rod in driving engagement with said hub, a sphere dispenser supported upon said carriage means, and means cooperating with said ring gear and said sphere dispenser for positioning said dispenser with respect to said hub.

25. Apparatus for calibrating a micrometeorite detector comprising a momentum sensitive transducer, means in spatial relationship to said transducer for releasing spheres for impact upon said transducer, and means for recording the electrical output of said transducer caused by the impact of said spheres, said means in spatial relationship for releasing spheres including circular support means having a peripheral rim, a rotatable hub centrally positioned upon said support means, means for driving said hub, means for dispensing spheres, means driven by and supported by said hub and said rim for supporting said means for dispensing spheres, and means for positioning said means for dispensing spheres with respect to said hub.

26. Apparatus for calibrating a micrometeorite detector comprising a momentum sensitive transducer, means in spatial relationship to said transducer for releasing spheres for impact upon said transducer, and means for recording the electrical output of said transducer due to the impact of said spheres upon said transducer, said means in spatial relationship for releasing spheres including circular support means having a peripheral rim, a rotatable hub centrally positioned upon said support means, means for driving said hub, a ring gear concentric with said hub and secured to said support means, a carriage means supported between said hub and said rim, said carriage means including a rod in driving engagement with said hub, a sphere dispenser supported upon said carriage means, said sphere dispenser including a trough, a helical screw passing therethrough and a gate positioned upon said trough and cooperating with said helical screw for dispensing spheres, and means cooperating with said ring gear and said sphere dispenser for positioning said dispenser with respect to said hub.

27. Apparatus for calibrating a micrometeorite detector comprising a momentum sensitive transducer detector, means in spatial relationship to said transducer for releasing spheres for impact upon said transducer, and means for recording the electrical output of said detector due to the impact of said spheres upon said detector, said means in spatial relationship for releasing spheres including circular support means having a peripheral rim, a rotatable hub centrally positioned upon said support means, means for driving said hub, a helical screw cooperating with gate means for dispensing spheres, means driven by and supported by said hub and said rim for supporting said helical screw and gate means, means in frictional engagement with said support means for rotating said screw and thereby permit said gate means to dispense spheres, a trough positioned above said helical screw and gate means for retaining a quantity of spheres, and a plurality of spheres of substantially uniform dimension and mass retained in said trough, said helical screw advancing said spheres through said gate means for seriatim impact upon said detector.

28. A method for dispensing objects in a prescribed pattern comprising the steps of positioning a central hub adjacent and coaxially a circular support having a peripheral rim, rotating the hub with respect to the support, supporting an object dispenser between the hub and the rim of the support, and dispensing objects from the object dispenser.

29. A method for dispensing objects in a prescribed pattern comprising the steps of positioning a central hub adjacent and coaxially a circular support having a peripheral rim, rotating the hub with respect to the support, supporting an object dispenser in driving engagement between the hub and the rim of the support, advancing the object dispenser with respect to the hub and the rim, and dispensing objects from the object dispenser so that the dispensed path of the objects is in accordance with the rotation of the hub and the advancement of the dispenser with respect to the hub.

30. A method for calibrating a micrometeorite detector comprising the steps of positioning a central hub adjacent to and coaxially with a circular support having a peripheral rim, rotating the hub with respect to the support, supporting an object dispenser in driving engagement between the hub and the rim of the support, advancing the object dispenser away from the hub and toward the rim, positioning a momentum sensitive transducer detector below the object dispenser, and dispensing objects from the object dispenser for impact upon the detector so that the objects are dispensed in a spiral path as controlled by the rotation of the hub and the advancement of the object dispenser.

31. The method as defined in claim 30 including the step of recording the electrical output from the detector produced by the impact of the objects upon the transducer detector.

References Cited

UNITED STATES PATENTS

| | | | |
|---|---|---|---|
| 1,112,275 | 9/1914 | Dueber | 222—413 |
| 2,699,672 | 1/1955 | Couch et al. | 73—12 |
| 2,729,094 | 1/1956 | Piety | 73—12 |

DAVID SCHONBERG, *Primary Examiner.*

LOUIS R. PRINCE, *Examiner*

S. C. SWISHER, *Assistant Examiner.*